Nov. 23, 1954   O. J. LEINS   2,695,136
SNAP-ACTION DEVICE
Filed Nov. 30, 1949   3 Sheets-Sheet 3

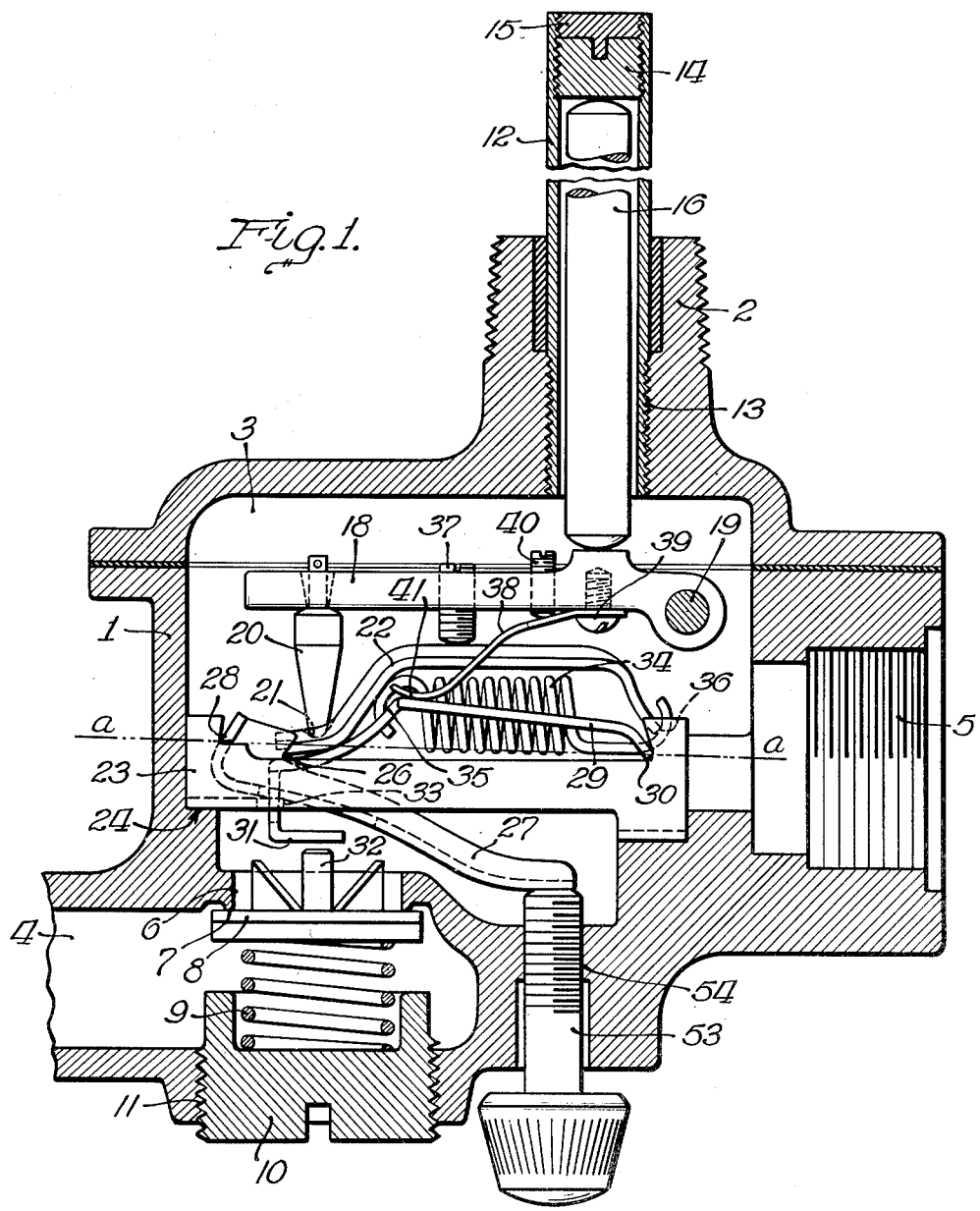

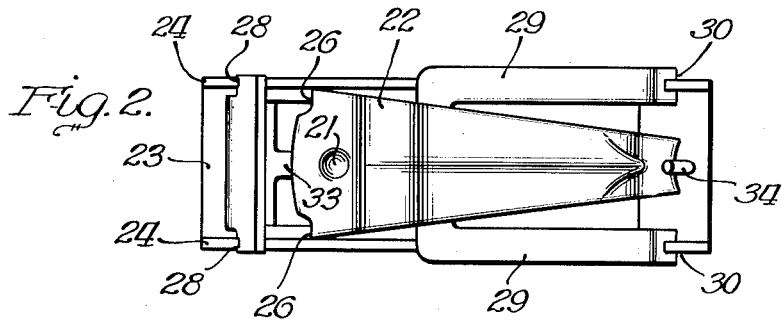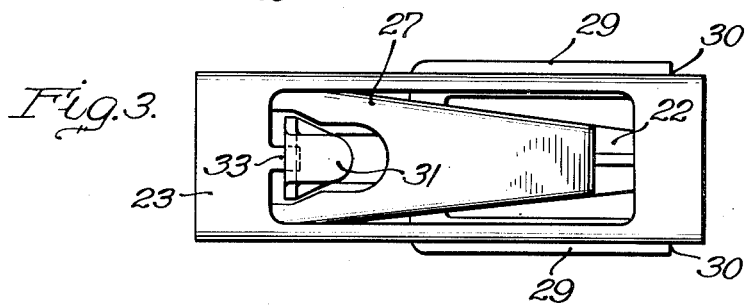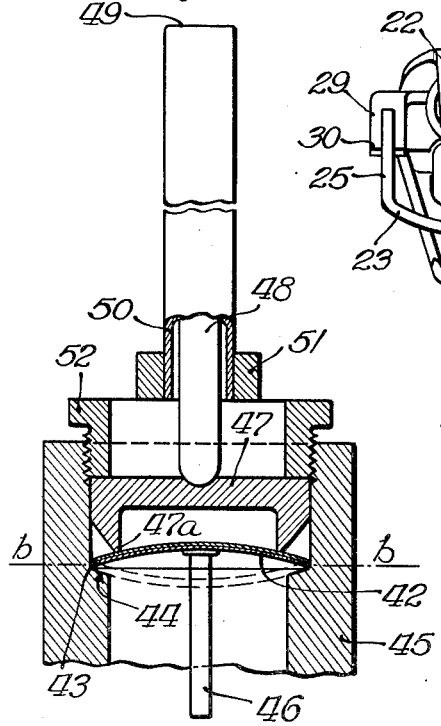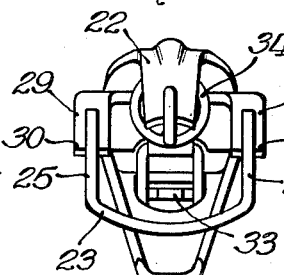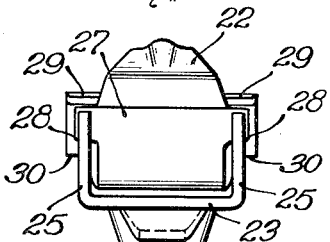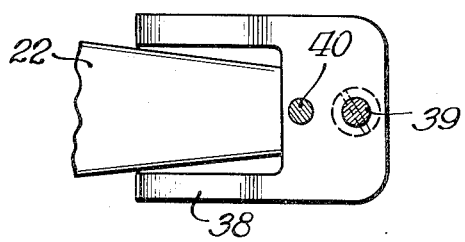

INVENTOR.
Oscar J. Leins
BY
Brown, Jackson, Boettcher & Dienner
Attys.

United States Patent Office 2,695,136
Patented Nov. 23, 1954

2,695,136

SNAP-ACTION DEVICE

Oscar J. Leins, Milwaukee, Wis., assignor to Milwaukee Gas Specialty Company, Milwaukee, Wis., a corporation of Wisconsin Application November 30, 1949, Serial No. 130,319

9 Claims. (Cl. 236—48)

This invention relates, in general, to a snap-action device, and has particular relation to a snap-action operating device for controlling the flow of fluid consequent upon changing conditions, such as the rise and fall in temperature.

While the particular device which will be described hereinafter in connection with the drawings is a thermostat controlled, snap-acting valve operating device for controlling the flow of fuel to the burner of a water heater or the like, it is to be understood that the invention, in its broader aspects, is not limited to this particular use but may be employed for all similar or suitable purposes.

The usual snap-action device of the prior art has only a relatively short snap-action range with respect to the total load and movement of the device. Where such devices have been employed with a thermostat, it has been the practice for the thermostat to operate the snap-action device through its total load and movement, i. e., not only to impart the snap action, but also to load or place the spring bias on the snap-action device.

These prior practices have the objection of placing all of the loading or spring biasing work, as well as the snap-action work, on the thermostat. As a result, the snap-action mechanism cannot be sensitive to as close a differential as may be desired, and where the thermostat is of the rod and tube type it must be of greater length than may be desired.

One of the main objects of the present invention is to provide an improved snap-action device which is preloaded and spring-biased independently of the thermostat, and wherein substantially only the snap-action work is placed on the thermostat.

Another object of the invention is to provide an improved snap-action device and thermostat combination, and, more particularly, an improved combination of snap-action device and rod and tube thermostat wherein the rod and tube thermostat is relatively short and sensitive to a closer differential than in prior devices of this sort.

Another object of the invention is to provide in a device of the class described, means for adjusting the amount of preloading or spring biasing of the snap action device and thereby the amount of work placed on the thermostat.

Another object of the invention is to provide means which will add not only to the sensitivity of the device, but also to the ability of the device to move a heavier valve or a larger valve.

Another object of the invention is to provide an improved form of snap-action device, and an improved form of snap-action device and thermostat combination having various features of novelty and advantages and which are particularly characterized by their simplicity in construction and their effectiveness in use.

Further objects and advantages of the invention will appear from the following detailed description, taken in connection with the accompanying drawings which illustrate the manner of constructing and using certain illustrative embodiments of the invention.

In the drawings:

Figure 1 is a longitudinal section through the casing of a thermostat-controlled valve operator embodying the present invention;

Figure 2 is a top plan view of the snap-action device;

Figure 3 is a bottom plan view of the snap-action device;

Figure 4 is an end view of the snap-action device taken from one end thereof;

Figure 5 is an end view of the snap-action device taken from its opposite end;

Figure 6 is a plan view of the spring for imposing on the valve operator arm spring pressure in the direction of its snap-action movement;

Figure 8 is a fragmentary longitudinal section showing another form of thermostat-controlled valve operator embodying the present invention.

Figure 7:
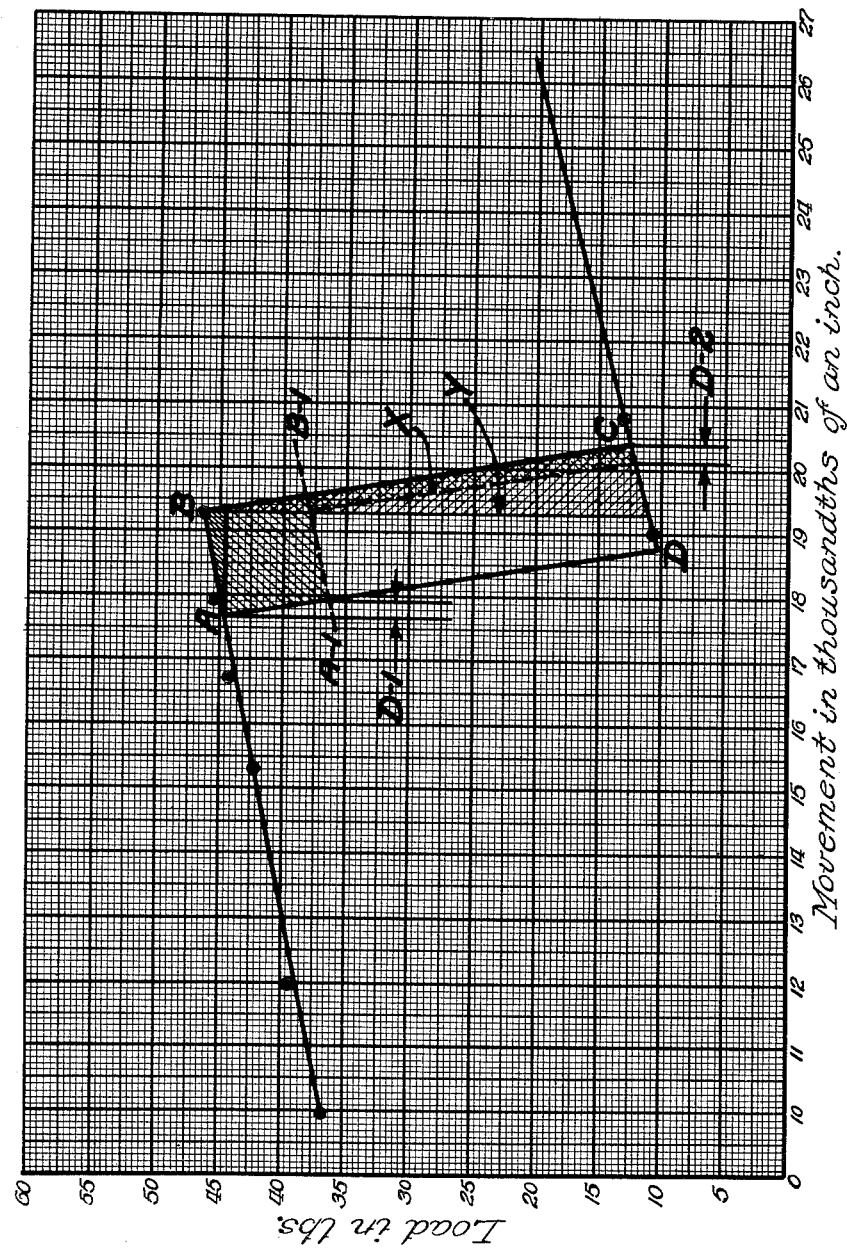
Figure 7 is a chart showing diagrammatically the forces required to snap a snap-action device.

With reference now to the drawings, the device shown in Figures 1–6 comprises a casing or valve body 1, preferably a casting, on which is formed a threaded boss 2 which fits, for example, through the side of the tank of a water heater (not shown), as well understood in the art.

The valve body 1 has an internal chamber 3, a fuel inlet 4, and a fuel outlet 5. Internally the valve body 1 has a fuel inlet port or opening 6, the outer end of which is surrounded at its inlet end by an annular valve seat 7. A valve member 8 is urged into closed position against the seat 7 by a coiled spring 9 interposed between the valve member 8 and a plug 10 screwed at 11 into the valve body 1.

The thermostat shown in Figure 1 is of the rod and tube type, and comprises a tube 12 which enters through the boss 2 and is screwed into the valve body 1 at its innermost end at 13. The tube 12 carries a plug screw 14 at its outermost end. The screw 14 may be soldered or otherwise secured at 15 in adjusted position and is adapted to bear upon an Invar or other suitable rod 16 which extends within the tube 12 and, at its innermost end 17, presses upon a lever 18 which is pivoted at 19. The lever 18 bears, at its outer end, against a thrust pin 20. The pin 20 bears, at 21, against a lever arm 22 of a snap-action device.

It will be understood by those versed in this art that the thermostat tube 12 has a relatively high coefficient of expansion, whereas the rod 16 has a lower coefficient of expansion. It results from this that, upon cooling of the tube 12, the inner end of the rod 16 moves downwardly or inwardly as the device is viewed in Figure 1. The opposite movement occurs upon heating the tube 12. It is assumed here that the thermostat 12, 16 is inserted, for example, in a water heater or the like which is heated by the main burner, the fuel supply for which burner is controlled by the valve member 8.

The snap-action device without the improvements according to the present invention is, in general, of the type marketed by The Titan Valve & Manufacturing Company, Cleveland, Ohio. This device comprises a channel-shaped frame 23, preferably a stamping, mounted in the valve body 1, for example, on a shoulder 24, with the side flanges 25 of the frame 23 directed upwardly. The lever arm 22 is fulcrumed at 26 upon an adjustment arm 27, which adjustment arm is fulcrumed at 28 on the side flanges 25 of the frame 23. An operator arm 29 is fulcrumed at the opposite end on the side flanges 25, at 30. The end of the arm 29 opposite its pivoted end 30 is of channel form to provide a valve actuating abutment 31 for engagement with a snapping pin 32 on the valve member 8. A lug 33 integral with the frame 23 extends into an opening in the portion of the channel-shaped end of the arm 29 which extends downwardly as the device is viewed in Figure 1. This lug 33 stops the outermost movement of the adjacent end of the operator arm 29 where this outward movement is not otherwise stopped, as will presently appear.

A coiled spring 34 has one end connected at 35 to the operator arm 29, and its opposite end is connected at 36 to the free end of the lever arm 22. The operator arm 29 is bifurcated adjacent to the spring 34 for operation of the spring between the spaced legs 35 of the arm 29. The spring 34 normally yieldingly constrains the lever arm 22 to the side of a neutral position or center line, shown in dotted lines at a—a in Figure 1, on which the rod and tube thermostat is disposed. The spring 34 also normally yieldingly constrains the valve actuating abutment 31 to retracted position away from the adjacent end of the valve pin 32 as shown in Figure 1.

A threaded stem 53 screwed, for example, at 54 through the adjacent wall of the valve body 1 engages the adjustment arm 27 for the purpose of adjusting the position of the arm 27 about its fulcrum 28 by turning the stem 53. This changes the position of the fulcrum 26 relative to the thermostat rod 16 so as to vary the range of temperature controlled by the thermostat which per se is well known in the art.

From the description thus far given it will be apparent that upon inward movement of the inner end of the thermostat rod 16, when the thermostat gets cooler, the pressure of the inner end of the rod 16, at 17, on the lever 18 swings this lever 18 counterclockwise about its pivot 19. As a result, the lever 18 forces the thrust pin 20 downwardly, and the pressure of this pin 20 on the lever arm 22, at 21, forces the lever arm 22 downwardly or clockwise about its fulcrum 26. As the free end of the lever 22 passes neutral position or center line a—a, the spring 34 snaps the operator arm 29 counterclockwise about its fulcrum 30. This snap-action of the arm 29 snaps the actuating abutment 31 downwardly, and this abutment, by engagement with the valve pin 32, snaps the valve 8 to open position against the action of the lighter or weaker spring 9, for example, for the flow of gas to the burner (not shown).

Upon retraction of the thermostat rod 16 caused by its tube 12 becoming hotter, the lever arm 22 swings upwardly about its fulcrum 26 as the device is viewed in Figure 1. As the free end of the lever 22 passes neutral position, the spring 34 snaps the operator arm 29 and its actuating abutment 31 back to the position shown in Figure 1, and the weaker spring 9 closes the valve member 8 upon its seat 7 to shut off the flow of fuel to the burner.

In order to place an initial preload and spring bias on the snap-action device so that substantially only the snap-action work is done by the thermostat, the present invention provides an adjustable stop for limiting the movement of the lever arm 22 in the direction in which it is normally constrained and which stop disposes the position in which the lever arm 22 is normally constrained in relatively close proximity to neutral position.

In the illustrated embodiment of the invention, the stop means set forth in the preceding paragraph comprises a factory adjustment screw 37 which is screwed, for example, in the lever 18 in such position that the inner end of the screw bears against the back of the lever arm 22 intermediate its pivot 19, and the place of engagement of the thrust pin 20 with the lever arm 22. The stop screw 37 limits motion of the lever 22 to the position shown in Figure 1. This position may be adjusted, for example, at the factory by screwing the stop screw 37 more or less from the inner end of the lever 18. As a result, there is placed an initial preload and spring bias on the snap-action device, and the inward movement of the inner end of the thermostat rod 16 does only the remaining work in snapping the snap-action device past its neutral position.

In the preferred embodiment of the invention the stop screw 37 stops the lever arm 22 in close proximity to, or substantially at, neutral position. As a result, substantially only the snap-action work is done by the thermostat. Moreover, the rod and tube thermostat may thus be relatively short, and is sensitive to a closer differential than in prior art devices.

It has been further ascertained that a spring bias on the back of the valve actuating or operator arm 29 will also add to the sensitivity of the device and to the ability of the device to move a heavier valve or a larger valve.

Accordingly there is shown a spring 38 secured, for example, to the lever 18 by a screw 39 or to any part of the frame. As shown in Figure 6, the spring 38 is of bifurcated form to straddle the lever arm 22 of the snap-action device. A tension adjustment screw 40 may also be provided for adjusting the tension in the spring 38. The screw 40 is shown screwed in the lever 18, but this may, of course, vary, and it is to be understood that within certain broader aspects of the invention, omission of the spring 38, or use of a different spring, are contemplated.

It has been found that with a given Titan type snap switch with a spring 38 bearing against the operator arm 29, at 41, about midway between the pivot point 30 and the outer end of the operator arm 29, a pressure of 7 pounds in the position shown and about 1½ pounds in the fully snapped or valve operating position will render the device more sensitive and further enable it to move or lift a much heavier valve than actually required. This also aids in relieving the rod and tube thermostat of stress to a modified extent even though more work is done at the output end. With both this spring 38 and the limit stop 37 it is contemplated to reduce the force required to snap to about 20% of that required without these two mechanisms.

From the foregoing it will now be apparent that it becomes feasible with the present invention to use a rod and tube with a multiplying length or lever 18 in such a manner that even with a short length thermostat tube 12 the snap mechanism can be sensitive to a closer differential than has been possible heretofore. A lever ratio of 5 or 6 to 1 between the point of bearing 17 of the thermostat rod 16 on the lever 18, the fulcrum 19 and the thrust pin 20, is contemplated. It is also contemplated that the present invention will enable the use of a 4½-inch thermostat tube 12 at a sensitivity of less than 20° F. for operation of the snap device from closed to open position, and vice versa. The results which the present invention provides have not been possible heretofore with other snap mechanisms with so short a tube.

In the embodiment of the invention illustrated fragmentarily and more or less diagrammatically in Figure 8, there is shown a snap disc or thermodisc 42 which has a neutral position along the line b—b and seats marginally at 43 on a shoulder 44, for example, in a boss 45. The disc 42 coacts at its center with a valve stem or valve operator 46.

A bearing cup 47 is pushed by an Invar or other suitable thermostat rod 48 connected at its outer end at 49 to a copper or other suitable thermostat tube 50. The tube 50 is mounted or fastened, for example, to a valve body or casting 51. The pusher 47 has an annular lip 47a engaging the disc 42, and is backed by an adjustment stop 52 so that the disc 42 is limited in at least one direction of travel by the stop 52. The stop 52 is shown in the form of a collar screwed into the boss 45, the adjustment of the disc 42 being obtained by screwing the collar into or from the boss 45.

With the structure shown in Figure 8, the stop 52 may be moved down to a point where the disc 42 becomes just about to snap. The rod and tube 48, 50 are then only required to exert effort in the snapping range to cause actuation of the valve operator 46. The disc 42 is of the self-return type, so that when force is relieved from the pusher 47 by an outward movement of the rod 48, the disc 42 will snap into the solid line position as shown in Figure 8. The other snap position is shown in dotted lines.

Referring now to the chart shown in Figure 7, as the thermostat rod, for example, moves in response to temperature, it follows the point from A to B at the upper center part of the chart. At B the snap point is attained and the rod relieves in stress as the device snaps from B to C. It is to be noted that at this point C, the load in pounds on the rod is about 12½ pounds. Thereafter as the rod and tube are heated, the rod moves from C to D at approximately 10 pounds load. At this point the snap mechanism is operated in its opposite sense to snap from D back to A. The cross-hatched portion X of the chart represents unloading force of the rod and tube upon snapping. The total area enclosed by the line A, B, C, D, and A is the total work done by the thermostat rod. The vertical line Y represents the absolute optimum snap line with zero differential.

From the above it will be seen that approximately the maximum preloading that can be put on one particular Titan snap mechanism would be about 10 pounds. The effect of this is to cut down the line A to B by approximately 10 pounds to the line A1 to B1, for example. This will cut out the amount of work represented by the cross-hatching on the chart. The net result of this will be a saving in differential of the D1+D2, or approximately 20% increase in sensitivity for this structure.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

I claim:

1. In combination, a snap-action device comprising a first arm fulcrumed at one end and having a neutral position, an operator arm fulcrumed near the opposite end of said first arm, a first spring connected between said first arm and said operator arm and normally constraining said first arm to one side of its neutral position, said first arm having loading and spring biasing movement from the position to which said arm is normally constrained, said spring imparting snap movement to said operator arm when said first arm passes its neutral position in movement from the position in which it is normally constrained to snap-acting position, stop means cooperating with said first arm to limit movement of said arm to the position to which it is normally constrained and to dispose said position in relatively close proximity to neutral position, a rod and tube thermostat coacting with said first arm and operable to move said first arm to the other side of its neutral position whereby to impart snap action movement to said operator arm through said spring, said rod and tube thermostat being of a length less than required to impart both loading and spring biasing movement to said first arm and snap-action movement to said operator arm, a pivoted lever interposed between the end of the rod of the thermostat and said first arm, the rod of said thermostat coacting with said first arm relatively close to its pivot, a thrust element coacting with said first arm and actuated by said lever at a position outwardly of the coaction of the rod of said thermostat with said lever, and a second spring secured to said pivoted lever and coacting with said operator arm for imposing on said operator arm spring pressure in the direction of snap action movement of said operator arm.

2. In combination, a snap-action device comprising a first arm fulcrumed at one end and having a neutral position, an operator arm fulcrumed near the opposite end of said first arm, a first spring connected between said first arm and said operator arm and normally constraining said first arm to one side of its neutral position, said first arm having loading and spring biasing movement from the position to which said arm is normally constrained, said spring imparting snap movement to said operator arm when said first arm passes its neutral position in movement from the position in which it is normally constrained to snap-acting position, stop means cooperating with said first arm to limit movement of said arm to the position to which it is normally constrained and to dispose said position in relatively close proximity to neutral position, a rod and tube thermostat coacting with said first arm and operable to move said first arm to the other side of its neutral position whereby to impart snap action movement to said operator arm through said spring, said rod and tube thermostat being of a length less than required to impart both loading and spring biasing movement to said first arm and snap-action movement to said operator arm, a pivoted lever interposed between the end of the rod of the thermostat and said first arm, the rod of said thermostat coacting with said first arm relatively close to its pivot, a thrust element coacting with said first arm and actuated by said lever at a position outwardly of the coaction of the rod of said thermostat with said lever, a second spring secured to said pivoted lever and coacting with said operator arm for imposing on said operator arm spring pressure in the direction of snap action movement of said operator arm, and means adjustably mounted on said pivoted lever and coacting with said last-mentioned spring for adjusting its coaction with said operator arm.

3. In combination, a pivoted adjustment arm, a snap action device comprising a second arm fulcrumed at one end on said adjustment arm and having a neutral position, an operator arm fulcrumed near the opposite end of said second arm, a spring connected between said second arm and said operator arm and normally constraining said second arm to one side of its neutral position, said second arm having loading and spring biasing movement from the position to which said arm is normally constrained, said spring imparting snap movement to said operator arm when said second arm passes its neutral position in movement from the position in which it is normally constrained to snap-acting position, stop means coacting with said second arm to limit movement of said arm in the direction in which it is normally constrained and to dispose the position in which said second arm is constrained in relatively close proximity to neutral position, said stop means being effective against said second arm when said second arm is in the position to which it is normally constrained by said spring, and a rod and tube thermostat coacting with said second arm and operable to move said second arm to the other side of its neutral position whereby to impart snap action movement to said operator arm through said spring, said rod and tube thermostat being of a length less than required to impart both loading and spring biasing movement to said second arm and snap action movement to said operator arm.

4. In a device of the class described, snap-acting means having a neutral position and comprising spring means normally constraining said snap-acting means to a position on one side of said neutral position and acting to actuate said snap-acting means to a position on the other side of neutral position when said snap-acting means is actuated past neutral position in a direction toward said other position, an actuated device actuated to one of at least two positions by said snap action of said snap-acting means to said other position and operable to a second position upon actuation of said snap-acting means to the side of neutral position to which it is normally constrained, condition responsive means, a pivoted lever extending between said condition responsive means and said snap-acting means and coacting with both said condition responsive means and said snap-acting means to actuate upon change in a condition said snap-acting means past neutral position in a direction away from the position to which it is normally constrained, said condition responsive means being loaded throughout its entire travel in the direction for actuating said snap acting means past neutral position in a direction away from the position to which it is normally constrained, and a screw carried by said lever and adjustably coacting with said snap-acting means for initially setting said snap-acting means into position on the side of said neutral position to which it is normally constrained but approximately at neutral position and for adjusting said initial setting.

5. In a device of the class described, snap-acting means having a neutral position and comprising spring means normally constraining said snap-acting means to a position on one side of said neutral position and acting to actuate said snap-acting means to a position on the other side of neutral position when said snap-acting means is actuated past neutral position in a direction toward said other position, an actuated device actuated to one of at least two positions by said snap action of said snap-acting means to said other position and operable to a second position upon actuation of said snap-acting means to the side of neutral position to which it is normally constrained, condition responsive means, a pivoted lever extending between said condition responsive means and said snap-acting means and coacting with both said condition responsive means and said snap-acting means to actuate upon change in a condition said snap-acting means past neutral position in a direction away from the position to which it is normally constrained, a screw carried by said lever and adjustably coacting with said snap-acting means for initially setting said snap-acting means into position on the side of said neutral position to which it is normally constrained but approximately at neutral position and for adjusting said initial setting, and a spring carried by said pivoted lever and coacting with said snap-acting means to bias same away from the position to which it is normally constrained.

6. In a device of the class described, snap-acting means having a neutral position and comprising spring means normally constraining said snap-acting means to a position on one side of said neutral position and acting to actuate said snap-acting means to a position on the other side of neutral position when said snap-acting means is actuated past neutral position in a direction toward said other position, an actuated device actuated to one of at least two positions by said snap action of said snap-acting means to said other position and operable to a second position upon actuation of said snap-acting means to the side of neutral position to which it is normally constrained, condition responsive means, a pivoted lever extending between said condition responsive means and said snap-acting means and coacting with both said condition responsive means and said snap-acting means to actuate upon change in a condition said snap-acting means past neutral position in a direction away from the position to which it is normally constrained, a screw carried by said lever and adjustably coacting with said snap-acting means for initially setting said snap-acting means into position on the side of said neutral position to which it is normally constrained but approximately at neutral position and for adjusting said initial setting, a spring carried by said pivoted lever and coacting with said snap-acting means to bias same away from the position to which it is normally constrained, and an adjustment screw carried by said pivoted lever and coacting with said last mentioned spring to adjust the bias of said spring on said snap-acting means.

7. In combination, a snap-action device comprising a first arm fulcrumed at one end and having a neutral position, an operator arm fulcrumed near the opposite end of said first arm, a spring connected between said first arm and said operator arm and normally constraining said first arm to one side of its neutral position, said first arm having loading and spring biasing movement from the position to which said arm is normally constrained, said spring imparting snap movement to said operator arm when said first arm passes its neutral position in movement from the position in which it is normally constrained to snap-acting position, stop means coacting with said first arm to limit movement of said arm in the direction in which it is normally constrained and to dispose the position in which said first arm is constrained in relatively close proximity to neutral position, a rod and tube thermostat coacting with said first arm and operable to move said first arm to the other side of its neutral position whereby to impart snap action movement to said operator arm through said spring, said rod and tube thermostat being of a length less than required to impart both loading and spring biasing movement to said first arm and snap action movement to said operator arm, and a second spring coacting with said operator arm for imposing on said operator arm spring pressure in the direction of snap action movement of said operator arm, said spring being anchored in spaced relation to its coaction with said operator arm and effective against said operator arm when said first arm is in the position to which it is normally constrained by said spring.

8. In combination, a snap acting device comprising a fulcrumed first arm having a neutral position, a fulcrumed operator arm extending from its fulcrum in a direction opposite that which said first arm extends from its fulcrum, a spring connected between said first arm and said operator arm and normally constraining said first arm to one side of its neutral position, said first arm having loading and spring biasing movement from the position to which said arm is normally constrained, said spring imparting snap movement to said operator arm when said first arm passes its neutral position in movement from the position in which it is normally constrained to snap-acting position, stop means coacting with said first arm to limit movement of said arm in the direction in which it is normally constrained and to dispose the position in which said first arm is constrained in relatively close proximity to neutral position, said stop means being effective against said first arm when said first arm is in the position to which it is normally constrained by said spring, and a rod and tube thermostat coacting with said first arm and operable to move said first arm to the opposite side of its neutral position whereby to impart snap-acting movement to said operator arm through said spring, said rod and tube thermostat being of a length less than required to impart both loading and spring biasing movement to said first arm and snap-acting movement to said operator arm.

9. In combination, a snap acting device comprising a fulcrumed first arm having a neutral position, a fulcrumed operator arm extending from its fulcrum in a direction opposite that which said first arm extends from its fulcrum, a spring connected between said first arm and said operator arm and normally constraining said first arm to one side of its neutral position, said first arm having loading and spring biasing movement from the position to which said arm is normally constrained, said spring imparting snap movement to said operator arm when said first arm passes its neutral position in movement from the position in which it is normally constrained to snap-acting position, stop means coacting with said first arm to limit movement of said arm in the direction in which it is normally constrained and to dispose the position in which said first arm is constrained in relatively close proximity to neutral position, said stop means being effective against said first arm when said first arm is in the position to which it is normally constrained by said spring, and condition responsive actuating means coacting with said first arm and operable in response to a predetermined condition to move said first arm to the other side of its neutral position whereby to impart snap-acting movement to said operator arm through said spring.

References Cited in the file of this patent

UNITED STATES PATENTS

| Number | Name | Date |
|---|---|---|
| 1,033,103 | Humphrey | July 23, 1912 |
| 1,321,395 | Rustige et al. | Nov. 11, 1919 |
| 1,499,947 | Ryan | July 1, 1924 |
| 1,897,155 | Vaughn | Feb. 14, 1933 |
| 1,953,446 | Strong | Apr. 3, 1934 |
| 2,296,898 | Bondurant | Sept. 29, 1942 |
| 2,328,642 | Green et al. | Sept. 7, 1943 |
| 2,341,967 | Weber | Feb. 15, 1944 |
| 2,528,756 | Kaser | Nov. 7, 1950 |